United States Patent
Lee et al.

(10) Patent No.: US 11,176,670 B2
(45) Date of Patent: Nov. 16, 2021

(54) APPARATUS AND METHOD FOR IDENTIFYING PHARMACEUTICALS

(71) Applicant: SAMSUNG ELECTRONICS CO., LTD., Suwon-si (KR)

(72) Inventors: So Young Lee, Daejeon (KR); Hyun Seok Moon, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 14 days.

(21) Appl. No.: 16/795,102

(22) Filed: Feb. 19, 2020

(65) Prior Publication Data

US 2020/0380679 A1     Dec. 3, 2020

(30) Foreign Application Priority Data

Jun. 3, 2019  (KR) .................. 10-2019-0065265

(51) Int. Cl.
*G06K 9/20*     (2006.01)
*G06T 7/00*     (2017.01)
(Continued)

(52) U.S. Cl.
CPC ............ *G06T 7/0014* (2013.01); *G06K 9/209* (2013.01); *G06K 9/4652* (2013.01);
(Continued)

(58) Field of Classification Search
CPC .................... G06T 7/0014; G06T 7/50; G06T 2207/10024; G06T 2207/30004;
(Continued)

(56) References Cited

U.S. PATENT DOCUMENTS 7,218,395 B2     5/2007   Kaye et al.
7,894,656 B2     2/2011   Kim
(Continued)

FOREIGN PATENT DOCUMENTS

CN    107613942 A  *  1/2018  ......... G06K 9/00771
JP    2005-279228 A    10/2005
(Continued)

OTHER PUBLICATIONS

Chun, Junchul et al., "A Contents-based Drug Image Retrieval System Using Shape Classification and Color Information", ResearchGate, Jan. 2011, pp. 117-128. (13 pages total).
(Continued)

*Primary Examiner* — Matthew C Bella
*Assistant Examiner* — Kathleen M Broughton
(74) *Attorney, Agent, or Firm* — Sughrue Mion, PLLC

(57) ABSTRACT

Provided is an apparatus for identifying pharmaceuticals, including an identifier configured to perform at least one of first identification of a medicine based on an image of the medicine in a pharmaceutical package or second identification of the medicine based on a spectrum of the medicine; a verifier configured to verify an error in dispensing the pharmaceutical package based on comparison of a result of the at least one of the first identification and the second identification with a prescription upon which the pharmaceutical package is prepared; and a controller configured to, based on a result of the first identification being unsuccessful, control to acquire the spectrum of the medicine and perform the second identification of the medicine.

23 Claims, 9 Drawing Sheets

(51) Int. Cl.
*G06T 7/50* (2017.01)
*H04N 5/232* (2006.01)
*G06K 9/62* (2006.01)
*G06K 9/46* (2006.01)

(52) U.S. Cl.
CPC ............. *G06K 9/6215* (2013.01); *G06T 7/50* (2017.01); *H04N 5/23299* (2018.08); *G06T 2207/10024* (2013.01); *G06T 2207/30004* (2013.01)

(58) Field of Classification Search
CPC .... G06K 9/209; G06K 9/6215; G06K 9/4652; G06K 9/00664; H04N 5/23299
See application file for complete search history.

(56) References Cited

U.S. PATENT DOCUMENTS

| | | | |
|---|---|---|---|
| 8,712,163 B1* | 4/2014 | Osheroff | G06K 9/00577 |
| | | | 382/195 |
| 9,031,853 B2 | 5/2015 | Bartfiled et al. | |
| 9,177,265 B2 | 11/2015 | Bartfield et al. | |
| 9,506,903 B2 | 11/2016 | Guthrie et al. | |
| 9,870,611 B2 | 1/2018 | Ito et al. | |
| 10,101,278 B2 | 10/2018 | Blair | |
| 2007/0008523 A1* | 1/2007 | Kaye | B07C 5/344 |
| | | | 356/300 |
| 2008/0149657 A1 | 6/2008 | Kim | |
| 2010/0232640 A1* | 9/2010 | Friend | G16H 30/20 |
| | | | 382/100 |
| 2016/0005160 A1 | 1/2016 | Ito et al. | |
| 2016/0299114 A1 | 10/2016 | Guthrie et al. | |
| 2017/0292908 A1* | 10/2017 | Wilk | G01J 3/0289 |

FOREIGN PATENT DOCUMENTS

| | | | | |
|---|---|---|---|---|
| JP | 5690662 B2 * | 3/2015 | ......... | G01N 21/3563 |
| KR | 10-2018-0044569 A | 5/2018 | | |

OTHER PUBLICATIONS

Kim, Dong Sun, "A Development of a Drug Image Retrieval System Using Drug Shape Classification and HSV Color Model", KGU, Dec. 2010. (65 pages total).

* cited by examiner

FIG. 3A

| PRESCRIBED MEDICINE | DOSE | FREQUENCY OF MEDICATION PER DAY | NUMBER OF DAYS OF MEDICATION | DOSAGE REGIMEN |
|---|---|---|---|---|
| A | 1 | 3 | 2 | |
| B | 1 | 3 | 2 | |
| ◁ | 0.5 | 1 | 2 | BREAKFAST |
| ⬭ | 1 | 1 | 2 | BREAKFAST |
| ⬭ | 1 | 1 | 2 | DINNER |
| ⬭ | 1 | 2 | 2 | |

APPARATUS AND METHOD FOR IDENTIFYING PHARMACEUTICALS

CROSS-REFERENCE TO RELATED APPLICATION(S)

This application claims priority from Korean Patent Application No. 10-2019-0065265, filed on Jun. 3, 2019, in the Korean Intellectual Property Office, the entire disclosure of which is herein incorporated by reference for all purposes.

BACKGROUND

1. Field

The example embodiments of the disclosure relate to identifying and verifying packaged pharmaceuticals.

2. Description of the Related Art

Hospitals or pharmacies generally dispense (prepare or compound) medicines to patients according to prescriptions of physicians. Patients with chronic illnesses need to take the same medicines on a daily basis and thus the medicines are typically prescribed for long-term use. For example, patients with high blood pressure or diabetes need to take the same medicines daily, and the medicines are prescribed for one to three or more months' use.

Since errors in dispensing medication may lead to medical accidents, correct dispensing of medication by a pharmacist is critical. However, identifying whether medicines are correctly dispensed is performed by pharmacist, which is susceptible to a human error. Therefore, there is a need for a method for detecting a medication dispensing error with high accuracy.

SUMMARY

According to an aspect of an example embodiment, there is provided an apparatus for identifying pharmaceuticals, the apparatus including: an identifier configured to perform at least one of first identification of a medicine based on an image of the medicine in a pharmaceutical package or second identification of the medicine based on a spectrum of the medicine; a verifier configured to verify an error in dispensing the pharmaceutical package based on comparison of a result of the at least one of the first identification and the second identification with a prescription upon which the pharmaceutical package is prepared; and a controller configured to, based on a result of the first identification being unsuccessful, control to acquire the spectrum of the medicine and perform the second identification of the medicine.

The verifier may include an image sensor configured to acquire the image of the medicine; and a spectroscopic sensor configured to obtain the spectrum of the medicine.

In the second identification, based on coordinate information of the medicine, the controller may be further configured to move the spectroscopic sensor to a position of the medicine.

In the first identification, the identifier may be further configured to generate coordinate information of the medicine based on the image of the medicine.

In the first identification, the identifier may be further configured to extract a shape feature of the medicine based on the image of the medicine, and perform at least one of obtaining a number of the medicine or identifying a name of the medicine based on the extracted shape feature.

The identifier may be further configured to identify the name of the medicine by comparing the extracted shape feature with a medicine database (DB).

In the second identification, based on the coordinate information of the medicine, and center coordinates of the pharmaceutical package, the controller may be further configured to control obtaining the spectrum of the medicine.

In the second identification, based on the spectrum of the medicine, the identifier may be further configured to identify at least one of an ingredient or a dosage of the medicine.

The apparatus may further include a display configured to display the medicine, with respect to which the error occurs, based on a result of verification of the verifier.

According to a type of the error, the display may be further configured to display the error using at least one of different colors, shapes, and characters.

The type of the error may include at least one of whether further analysis of the medicine is needed, an error in a name of the medicine, an error in a count of the medicine, an error in an ingredient of the medicine, and an error in a dosage of the medicine.

The verifier may be configured to determine, based on the result of the first identification, at least one of whether the further analysis is needed, the error in the name of the medicine, and the error in the count of the medicine, and determine, based on the result of the second identification, at least one of the error in the ingredient of the medicine and the error in the dosage of the medicine.

The controller may be further configured to control the display to display the error based on coordinates of the medicine and the type of the error.

According to an aspect of an example embodiment, there is provided a method of identifying pharmaceuticals, the method including: performing first identification based on an image of a medicine in a pharmaceutical package; obtaining a spectrum of the medicine based on a result of the first identification being unsuccessful; performing second identification of the medicine based on the obtained spectrum; and verifying an error in dispensing the pharmaceutical package based on comparison of a result of the at least one of the first identification and the second identification with a prescription upon which the pharmaceutical package is prepared.

The performing the first identification may include generating coordinate information of the medicine based on the medicine.

The performing the first identification may further include: extracting a shape feature of the medicine based on the image of the medicine; and performing at least one of obtaining a number of the medicine or identifying a name of the medicine based on the extracted shape feature.

The identifying the name of the medicine may include comparing the extracted shape feature with a medicine database (DB).

The method may further include, in the second identification, moving a spectroscopic sensor to a position of the medicine based on coordinate information of the medicine and obtaining the spectrum of the medicine by using the spectroscopic sensor.

The performing the second identification may include identifying at least one of an ingredient or a dosage of the medicine based on the spectrum.

The verifying may include verifying whether further analysis of the medicine is needed, an error in a name of the medicine, an error in a count of the medicine, an error in an ingredient of the medicine, and an error in a dosage of the medicine.

The method may further include displaying the medicine, with respect to which the error occurs, based on a result of the verifying.

According to an aspect of an example embodiment, there is provided a mobile terminal, including: an image sensor configured to capture an image of a medicine; a spectroscopic sensor configured to obtain a spectrum of the medicine; and a processor configured to control the image sensor and the spectroscopic sensor, wherein the processor is further configured to perform first identification of the medicine based on the image of the medicine, and based on a result of the first identification being unsuccessful, configured to control the spectroscopic sensor to obtain the spectrum of the medicine and perform second identification of the medicine based on the obtained spectrum.

The first identification may include obtaining a shape feature of the medicine, and identifying a name of the medicine by comparing the obtained shape feature with a medicine DB; and the second identification may include identifying at least one of an ingredient or a dosage of the medicine.

The mobile terminal may further include a communication interface configured to transmit, to an external device, information on the medicine, which is not identified by at least one of the first identification and the second identification, and configured to receive information on identification of the medicine from the external device.

The mobile terminal may further include an output interface configured to output the information on the identification of the processor.

BRIEF DESCRIPTION OF THE DRAWINGS

The above and/or other aspects of the disclosure will become apparent and more readily appreciated from the following description of the example embodiments, taken in conjunction with the accompanying drawings.

FIGS. 3A and 3B are diagrams illustrating an example of displaying medicines, in which an error occurs.

DETAILED DESCRIPTION

Figure 1:
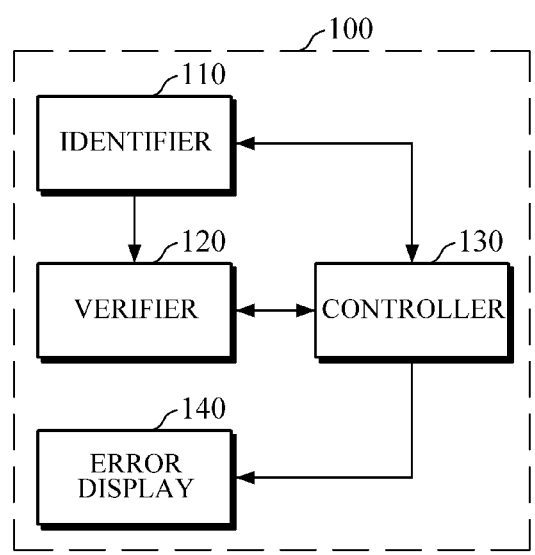
FIG. 1 is a block diagram illustrating an apparatus for identifying pharmaceuticals according to an example embodiment of the disclosure.

Details of example embodiments are included in the following detailed description and drawings. Aspects and features of the disclosure, and a method of achieving the same will be more clearly understood from the following embodiments described in detail with reference to the accompanying drawings. Throughout the drawings and the detailed description, unless otherwise described, the same drawing reference numerals will be understood to refer to the same elements, features, and structures. Throughout the drawings and the detailed description, unless otherwise described, the same drawing reference numerals will be understood to refer to the same elements, features, and structures. The relative size and depiction of these elements may be exaggerated for clarity, illustration, and convenience.

It will be understood that, although the terms first, second, etc. may be used herein to describe various elements, these elements should not be limited by these terms. These terms are only used to distinguish one element from another. Any references to singular may include plural unless expressly stated otherwise. In addition, unless explicitly described to the contrary, an expression such as "comprising" or "including" will be understood to imply the inclusion of stated elements but not the exclusion of any other elements. Also, the terms, such as 'part' or 'module', etc., should be understood as a unit that performs at least one function or operation and that may be embodied as hardware, software, or a combination thereof.

In the disclosure, the term "at least one of" includes any and all combinations of one or more of the associated listed items. For example, the term "at least one of A and B" or "at least one of A or B" is only used to describe that three cases may exist: only A exists, both A and B exist, and only B exists. Similarly, "at least one of A, B, and C" or "at least one of A, B, or C" indicates that there may exist seven cases: only A exists, only B exists, only C exists, both A and B exist, both A and C exist, both C and B exist, and all A, B, and C exist.

In the following description, the term "dispense" or "dispensing" may refer to any activity that involves the preparation or compounding of medicine for patients.

Hereinafter, an apparatus and a method for identifying pharmaceuticals will be described with reference to the accompanying drawings.

FIG. 1 is a block diagram illustrating an apparatus for identifying pharmaceuticals according to an example embodiment of the disclosure.

Referring to FIG. 1, the apparatus 100 for identifying pharmaceuticals includes an identifier 110, a verifier 120, a controller 130, and an error display (or a display) 140. At least some functions of the identifier 110, and the verifier 120 and the controller 130 may be implemented by one processor, or a suitable combination of two or more processors.

Based on an image of a medicine in a pharmaceutical package (hereinafter referred to as a "first medicine"), the identifier 110 may perform first identification of the first medicine. The pharmaceutical package may include one or more of the first medicine which are dispensed as prescribed. The identifier 110 may include an image sensor which captures and acquires images of the pharmaceutical package. The image sensor may include a charge coupled device (CCD), a complementary metal-oxide semiconductor (CMOS), and the like, but is not limited thereto.

For example, the identifier 110 may perform the first identification, including at least one of recognizing a region of the first medicine, extracting a shape feature of the first medicine, calculating a number of the first medicine, and identifying a name of the first medicine, in the captured image of the pharmaceutical package.

For example, once the image sensor captures and acquires the image of the pharmaceutical package, the identifier 110 may recognize a region, in which the first medicine exists, in the acquired image by using various region recognition methods which are already known. In this case, if there are a plurality of first medicines, a plurality of regions may be recognized.

Further, upon recognizing the region of the first medicine, the identifier 110 may generate coordinate information of the first medicine based on the recognition result. In an example embodiment, the coordinate information of the first medicine may be coordinates of a center position of the recognized region. For example, the identifier 110 may calculate center coordinates of the pharmaceutical package, and may calculate relative coordinates of the recognized region with respect to the center coordinates of the of the pharmaceutical package. Alternatively, the identifier 110 may further include a tray, on which the prepared pharmaceutical package is placed. Once the prepared pharmaceutical package is placed on the tray, the identifier 110 may calculate the relative coordinates of the recognized region based on coordinates of a center position of the tray.

The identifier 110 may store the calculated center coordinates of the pharmaceutical package or the coordinate information of the first medicine in a storage module. In this case, the storage module may be mounted in the apparatus 100 for identifying pharmaceuticals, or the storage module may be an external device connected by wire or wirelessly to the apparatus 100 for identifying pharmaceuticals.

The storage module may include at least one storage medium of a flash memory type memory, a hard disk type memory, a multimedia card micro type memory, a card type memory (e.g., an SD memory, an XD memory, etc.), a Random Access Memory (RAM), a Static Random Access Memory (SRAM), a Read Only Memory (ROM), an Electrically Erasable Programmable Read Only Memory (EEPROM), a Programmable Read Only Memory (PROM), a magnetic memory, a magnetic disk, and an optical disk, and the like, but is not limited thereto.

Upon recognizing regions of the one or more first medicines in the captured image of the pharmaceutical package, the identifier 110 may extract a shape feature of each of the first medicines based on each of the recognized regions. The shape feature may include area, character, shape, texture, color, and the like, but is not limited thereto.

Upon extracting the shape feature of each of the first medicines, the identifier 110 may calculate the number of the extracted first medicines. Further, the identifier 110 may identify the name of the first medicines by comparing the shape feature of each of the first medicines with a medicine database (DB).

For example, the identifier 110 may compare similarity between the shape feature and data stored in the medicine DB. The similarity may include at least one of Euclidean distance, Pearson correlation coefficient, Spearman correlation coefficient, Cosine similarity, but is not limited thereto.

For example, based on a similarity between the shape feature of the first medicine and specific data of the medicine DB being greater than or equal to a predetermined threshold, the identifier 110 may determine a medicine name of the specific data to be a name of the first medicine. In the case where there are a plurality of data having similarity which is greater than or equal to a predetermined threshold, the identifier 110 may determine a medicine name corresponding to the data of the medicine DB, having the highest similarity based on a setting, to be a name of the first medicine; or may determine that it is not possible to identify a name of the medicine. In an example embodiment, based on absence of data having similarity with the shape feature of the first medicine which is greater than or equal to a predetermined threshold, among data of the medicine DB, the identifier 110 may determine that it is not possible to identify a name of the medicine.

The medicine DB may be stored in the storage module of the apparatus 100 for identifying pharmaceuticals. However, the medicine DB is not limited thereto, and a medicine DB stored in an external device may also be used. For example, the identifier 110 may be connected to an external device through a communication module, which is mounted in the apparatus 100 for identifying pharmaceuticals, to receive a medicine DB from the external device, and may compare a shape feature of the first medicine with the received medicine DB; or may transmit a shape feature of the first medicine to the external device, to allow the external device to compare the shape feature of the first medicine with the medicine DB of the external device, and may receive a result of comparison from the external device.

In this case, the communication module may perform communication by using communication techniques, such as Bluetooth communication, Bluetooth Low Energy (BLE) communication, Near Field Communication (NFC), WLAN communication, Zigbee communication, Infrared Data Association (IrDA) communication, Wi-Fi Direct (WFD) communication, Ultra-Wideband (UWB) communication, Ant+ communication, WIFI communication, Radio Frequency Identification (RFID) communication, 3G communication, 4G communication, 5G communication, and the like, but is not limited thereto.

Based on a spectrum of a medicine which is not identified in the first identification (hereinafter referred to as a "second medicine"), the identifier 110 may perform second identification of the second medicine. In an example embodiment, the identifier 110 may include a spectroscopic sensor which obtains a spectrum of the second medicine. The spectroscopic sensor may be a Raman spectroscopy sensor using monochromatic laser light. However, the identifier 110 is not limited thereto, and may include a spectroscopic sensor using near-infrared spectroscopy, mid-infrared spectroscopy, and the like.

For example, in the case where there is the second medicine which is not identified in the first identification (that is, a result of the first identification of the medicine is unsuccessful), the Raman spectroscopy sensor may move to the position of the second medicine under the control of the controller 130 to emit laser light to the second medicine, and may obtain a spectrum of the second medicine using Raman spectroscopy by detecting light scattered from an active ingredient and the like of the second medicine.

Upon obtaining the Raman spectrum of the second medicine, an ingredient of which is not identified, the identifier 110 may refer to a pharmaceutical ingredient DB to perform qualitative and/or quantitative analysis on the Raman spectrum obtained based on spectrum data of medicines, ingredients of which are already known (hereinafter referred to as a calibration set). In this case, the identifier 110 may perform qualitative and/or quantitative analysis by comparing similarity in shape between the calibration set and the obtained Raman spectrum and a set of wavelengths greater than or equal to a predetermined value, or may perform qualitative and/or quantitative analysis based on the Beer-Lambert Law. However, the analysis is not limited thereto, and may be performed using various known methods, such that detailed description thereof will be omitted.

The pharmaceutical ingredient DB may be stored in the storage module of the apparatus 100 for identifying pharmaceuticals. However, the pharmaceutical ingredient DB is not limited thereto, and a pharmaceutical ingredient DB stored in an external device may also be used. For example, the identifier 110 may be connected to an external device through a communication module, and may perform spectral analysis by receiving a pharmaceutical component DB from the external device; or may transmit spectrum data to the external device to allow the external device to perform spectral analysis, and may receive an analysis result from the external device.

The verifier 120 may compare medicine information obtained in the first identification and the second identification, e.g., the number and name of each of the first medicines and the like obtained in the first identification, with prescriptions; and may verify dispensing errors (or errors in compounding medicine), including whether a medicine requires precise and/or further analysis, or a drug name error (e.g., an error in using the correct drug) or a drug count error (e.g., an error in using the correct dosage of drug). Further, the verifier 120 may compare an ingredient, a dosage, and the like of the second medicine, obtained in the second identification, with prescriptions; and may verify a dispensing error such as an ingredient error or a dosage error.

The controller 130 may control the identifier 110. For example, the controller 130 may first control the image sensor to acquire an image of a pharmaceutical package which requires verification as to whether there is a dispensing error. Further, once the image sensor acquires the image, the controller 130 may control the identifier 110 to perform the first identification. In an example embodiment, the identifier 110 may perform the aforementioned first identification by using, for example, an image analysis algorithm.

If there is a second medicine which is not identified by the identifier 110 in the first identification (that is, a result of the first identification of the medicine is unsuccessful), the controller 130 may control a spectroscopic sensor to obtain a spectrum of the second medicine. For example, the controller 130 may control the spectroscopic sensor to move to the position of the second medicine based on the coordinate information of the medicine and/or the center coordinates of the pharmaceutical package, which are obtained in the first identification; and when the spectroscopic sensor moves to the position of the second medicine, the controller 130 may drive a light source of the spectroscopic sensor to emit light to the second medicine. In addition, when the spectroscopic sensor obtains the spectrum of the second medicine, the controller 130 may control the identifier 110 to perform the second identification. In this case, the identifier 110 may perform the second identification by using an ingredient analysis algorithm based on a spectrum.

If there is a dispensing error upon verification by the verifier 120, the controller 130 may control the error display 140 to display the error, so that a user may easily recognize the error.

The error display 140 may display a medicine, in which a dispensing error occurs, under the control of the controller 130. In this case, the error display 140 may include a plurality of light-emitting diodes (LEDs), but is not limited thereto, and may also include an acoustic signal generator and/or a vibration generator for notifying a user of the occurrence of the dispensing error. For example, when dispensing errors occur, the error display 140 may display the errors in different colors, shapes, characters, and the like according to the types of errors. For example, the types of errors may include a case where a specific medicine requires precise analysis and a drug count error, which are obtained based on a result of the first identification using image analysis; and a dosage error, an ingredient error, and the like, which are obtained based on a result of the second identification using spectrum analysis.

Figure 2:
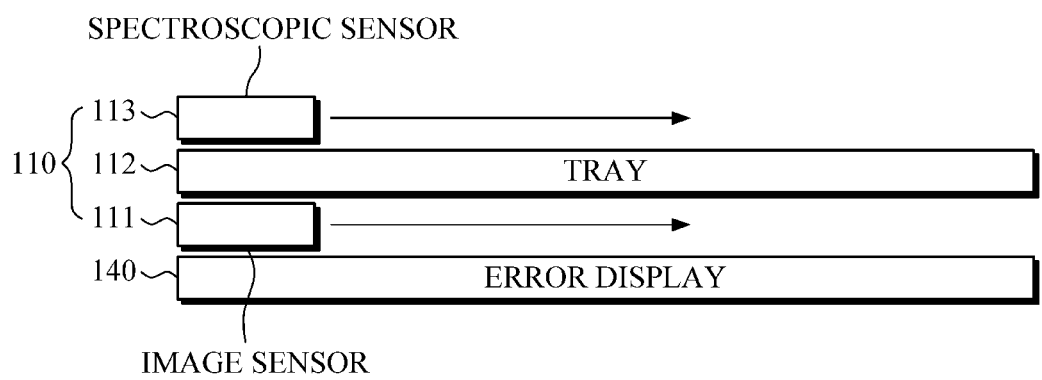
FIG. 2 is a diagram illustrating an example of a structure of an identifier and an error display of an apparatus for identifying pharmaceuticals.
Figure 3B:
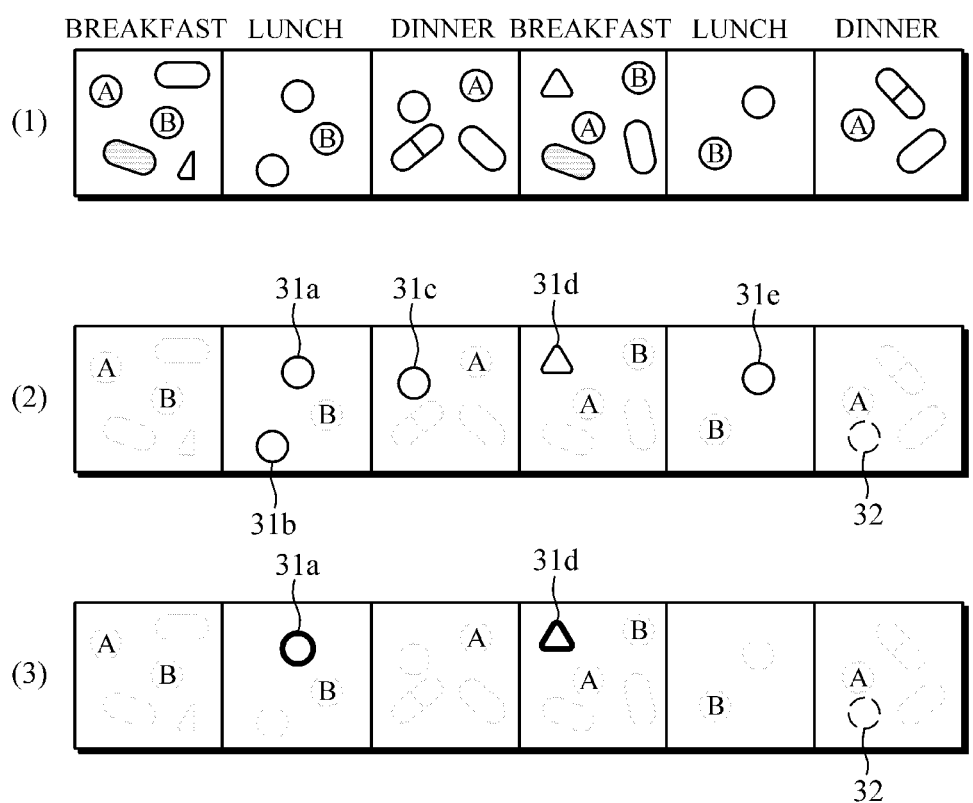

FIG. 2 is a diagram illustrating an example of a structure of an identifier and an error display of an apparatus for identifying pharmaceuticals; and FIGS. 3A and 3B are diagrams illustrating an example of displaying medicines, in which an error occurs.

Referring to FIGS. 1 and 2, the identifier 110 includes an image sensor 111, a tray 112, and a spectroscopic sensor 113.

The image sensor 111 may be disposed at a first side (e.g., left side) below the tray 112, and moves from the first side to a second side (e.g., right side) below the tray 112 to capture images of a pharmaceutical package placed on the tray 112. However, this is merely an example and the location of the image sensor 111 according to the disclosure is not limited thereto, and the image sensor 111 may be located at any arbitrary position with respect to the tray 112.

The tray 112 is disposed above the image sensor 111 and below the spectroscopic sensor 113, and a predetermined number of pharmaceutical packages may be placed on the tray 112.

The spectroscopic sensor 113 is disposed at a first side (e.g. left side) above the tray 112, and moves to a second side (e.g. right side) to measure a spectrum of a medicine in the pharmaceutical package placed on the tray 112, which is disposed below the spectroscopic sensor 113.

Although not illustrated in FIG. 2, the identifier 110 may further include: a pharmaceutical package waiting unit (e.g., a pharmaceutical package waiting assembly), which is disposed on one side (e.g., left side) of the tray 112, and on which a fully prepared pharmaceutical package is placed; and a pharmaceutical package transfer unit (e.g., a pharmaceutical package transfer assembly), which transfers the pharmaceutical package to a correct position on the tray 112 when the pharmaceutical package is placed on the pharmaceutical package waiting unit. In addition, the identifier 110 may further include an image sensor transfer unit which transfers the image sensor 111, so that the image sensor 111 may move from one side to the other side to capture images of the pharmaceutical package. Moreover, the identifier 110 may further include a spectroscopic sensor transfer unit (e.g., a spectroscopic sensor transfer assembly) which transfers the spectroscopic sensor 113, so that the spectroscopic sensor 113 may move from one side to the other side to obtain a spectrum of a medicine.

Once the prepared pharmaceutical package is placed on the tray 112, the controller 130 may drive the image sensor 111, and may control the image sensor transfer unit to move the image sensor 111 from one side to the other side below the tray 112, so that the image sensor 111 may scan the entire pharmaceutical package placed on the tray 112. Further, once the pharmaceutical package is placed on the pharmaceutical package waiting unit disposed on one side of the tray 112, the controller 130 may control the pharmaceutical package transfer unit to transfer the pharmaceutical package, so that the pharmaceutical package may be automatically placed in a correct position of the tray 112.

When the identifier 110 performs the first identification on the first medicine based on the image of the pharmaceutical package obtained by the image sensor 111, the controller 130 may receive a result of the first identification. If there is a second medicine which is not identified in the first identification, the controller 130 may identify coordinates of the second medicine, and may move the spectroscopic sensor 113 to a position of the identified coordinates. In an example embodiment, the controller 130 may control the spectroscopic sensor transfer unit based on the center coordinates of the tray 112 and the coordinates of the second medicine, so that the spectroscopic sensor 113 may be positioned above the second medicine; and once the spectroscopic sensor 113 is positioned above the second medicine, the controller 130 may control the spectroscopic sensor 113 to obtain a spectrum of the second medicine.

Further, as illustrated herein, the error display 140 may be disposed below the image sensor 111 and the tray 112. In this case, the error display 140 may be formed to have a size corresponding to the size of the tray 112, and may include an array of a plurality of light sources to emit light to each pharmaceutical package placed on the tray 112. One or a plurality of light sources may be formed at each position of the pharmaceutical packages. In this case, the light source may be an LED, but is not limited thereto.

The controller 130 may control the error display 140 based on a verification result of the verifier 120. For example, the controller 130 may control an LED corresponding to a pharmaceutical package, in which a dispensing error is found, or a position of a medicine in the pharmaceutical package, in which a dispensing error occurs; and may control the error display 140 to display the error in a predetermined color, shape, or character according to an error type of the pharmaceutical package or an error type of the medicine, so that a user may easily verify the dispensing error.

FIG. 3A illustrates an example of prescriptions, and FIG. 3B illustrates an example of medicines dispensed as prescribed. FIGS. 3A and 3B illustrate acquired images, showing that as the number of days of medication is two, six pharmaceutical packages are prepared and placed on the tray 112. In FIG. 3B, it is assumed that the first three packages are for the first day's use of medication, and the following three packages are for the second day's use of medication.

In FIG. 3B, (2) illustrates a dispensing error verified by the error display 140 based on a result of image analysis (e.g., first identification). Referring to (2) of FIG. 3B, pills 31a, 31b, 31c, and 31d, which are determined as requiring precise analysis, are shown with thin solid lines, but it is assumed that the lines are displayed in a first color (e.g., blue) in an example implementation for convenience of explanation. Further, a pill 32, in which it is determined that a drug count error occurs based on the first identification, is shown with a dotted line, but it is assumed that the lines are displayed in a second color (e.g., yellow) in an example implementation for convenience of explanation.

For example, according to the prescriptions of FIG. 3A, the pharmaceutical packages of pills to be taken at lunch should contain only pills A and B. However, based on the result of image analysis of the pharmaceutical package to be taken at lunch of the first day, the pill B is identified, but the two pills 31a and 31b may be turned over upside down, such that drug names of the pills 31a and 31b are not identified accurately. The verifier 120 classifies the two pills 31a and 31b as medicines requiring precise analysis, and based on coordinate information of the pills 31a and 31b, the controller 130 may control the light sources of the error display 140, which are disposed at positions corresponding to the coordinates of the pills 31a and 31b, to display the pills 31a and 31b in blue.

Likewise, upon analyzing the images of pharmaceutical packages of pills to be taken at dinner of the first day and at lunch of the second day, some pills 31c and 31e may be turned over upside down, such that drug names of the pills 31c and 31e may not be identified accurately, and thus the pills 31c and 31e are classified as medicines requiring precise analysis and are displayed in blue.

Further, upon analyzing the image of the pharmaceutical package of pills to be taken at breakfast of the second day, there should be only a half of the pill 31d, but one pill 31d is contained. In this case, it is determined based on the image analysis that there is a difference in shape, area, and the like, such that the pill 31d is classified as a medicine requiring precise analysis, and is also displayed in blue.

In addition, upon analyzing the image of a pharmaceutical package of pills to be taken at dinner of the second day, a pill 32 is omitted and is not contained in the package. Referring to the prescriptions, the pharmaceutical package of pills to be taken at dinner should contain four pills, but it is determined based on the image analysis that a region of the one pill 32 is not recognized, and the pill 32 is classified as a drug count error and is displayed in yellow.

In FIG. 3B, (3) illustrates an example of displaying a dispensing error verified by the error display 140 based on a result of spectrum analysis (e.g., second identification). Referring to (3) of FIG. 3B, based on a result of spectrum analysis of the pills 31a and 31b to be taken at lunch of the first day which require precise analysis, ingredients thereof are both identified as pill A, but the dosage thereof is twice the prescribed dosage, such that the pill 31b as shown in (2) of FIG. 3B is excluded from being displayed as an error, and the pill 31a is displayed as a dosage error. Referring to (3) of FIG. 3B, the dosage error is displayed with a thick line, but it is assumed that the error is displayed in red for convenience of explanation. Further, based on a result of spectrum analysis of the pill 31d to be taken at breakfast of the second day which requires precise analysis, the ingredient thereof is the same as the prescription, but the dosage thereof is twice the prescribed dosage, such that the pill 31d is identified as a dosage error and is displayed in red.

Moreover, based on a result of spectrum analysis of the pill 31c, which is to be taken at dinner of the first day and requires precise analysis, the ingredient and dosage thereof is identified as a dosage of pill B, and thus is excluded from being displayed as an error. In addition, based on a result of spectrum analysis of the pill 31e, which is to be taken at lunch of the second day and requires precise analysis, the ingredient and dosage thereof is identified as a dosage of pill A, and thus is excluded from being displayed as an error. Further, the pill 32 to be taken at dinner of the second day is omitted, such that the pill 32 is continuously displayed in yellow to indicate a drug count error.

The examples of displaying errors by the error display 140 are described above, but displaying errors is not limited thereto, and the errors may be distinguished from each other by using various other colors, shapes, characters, and the like according to types of dispensing errors, and an acoustic signal, vibrations, and the like may also be output along with the errors, thereby allowing a user to recognize the dispensing errors more easily.

Figure 4:
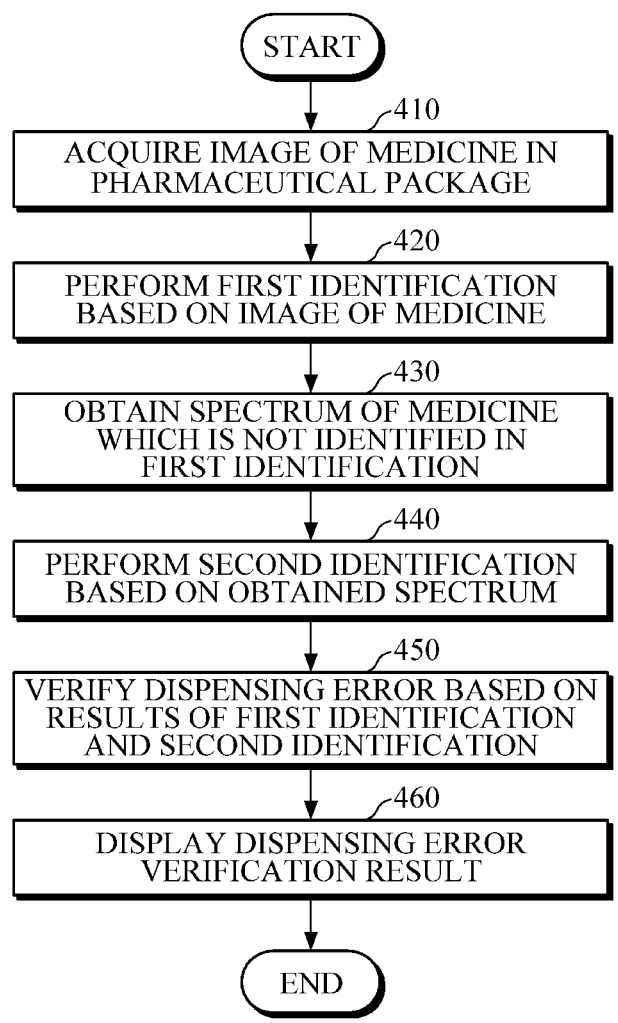
FIG. 4 is a flowchart illustrating a method of identifying pharmaceuticals according to an example embodiment of the disclosure.

FIG. 4 is a flowchart illustrating a method of identifying pharmaceuticals according to an example embodiment of the disclosure. The method of FIG. 4 is an example of a method of identifying pharmaceuticals which is performed by the apparatus 100 for identifying pharmaceuticals.

The apparatus 100 for identifying pharmaceuticals may control an image sensor to acquire images of medicines in a pharmaceutical package in 410, and may perform first identification based on the acquired images in 420. For example, the apparatus 100 for identifying pharmaceuticals may identify a name and number of each medicine in the pharmaceutical package by using an image analysis method.

Then, the apparatus 100 for identifying pharmaceuticals may control a spectroscopic sensor to obtain a spectrum of a medicine in 430 which is not identified in the first identification; and may perform second identification on the medicine in 440, which is not identified in the first identification, based on the obtained spectrum. For example, the apparatus 100 for identifying pharmaceuticals may analyze the ingredient and dosage of the medicine by comparing the spectrum of the medicine with spectrum data of already known pharmaceutical ingredients.

Subsequently, the apparatus 100 for identifying pharmaceuticals may verify a dispensing error based on at least one of a result of the first identification or a result of the second identification in 450. For example, by comparing at least one of the first and second identification results with prescription data, the apparatus 100 for identifying pharmaceuticals may classify dispensing errors into a case where a medicine, in which the dispensing error occurs, requires precise analysis, a drug name error, a drug count error, a dosage error, an ingredient error, and the like. However, these are merely examples and the dispensing errors identified by the apparatus 100 according to the disclosure are not limited thereto.

Next, the apparatus 100 for identifying pharmaceuticals may control an error display to display a dispensing error verification result in 460. For example, according to types of errors of each medicine, in which the dispensing errors classified in 450 occur, the apparatus 100 for identifying pharmaceuticals may display the medicines in different colors to allow a user to easily recognize pharmaceutical packages and medicines, in which the dispensing errors exist, and types of the errors.

Figure 5:
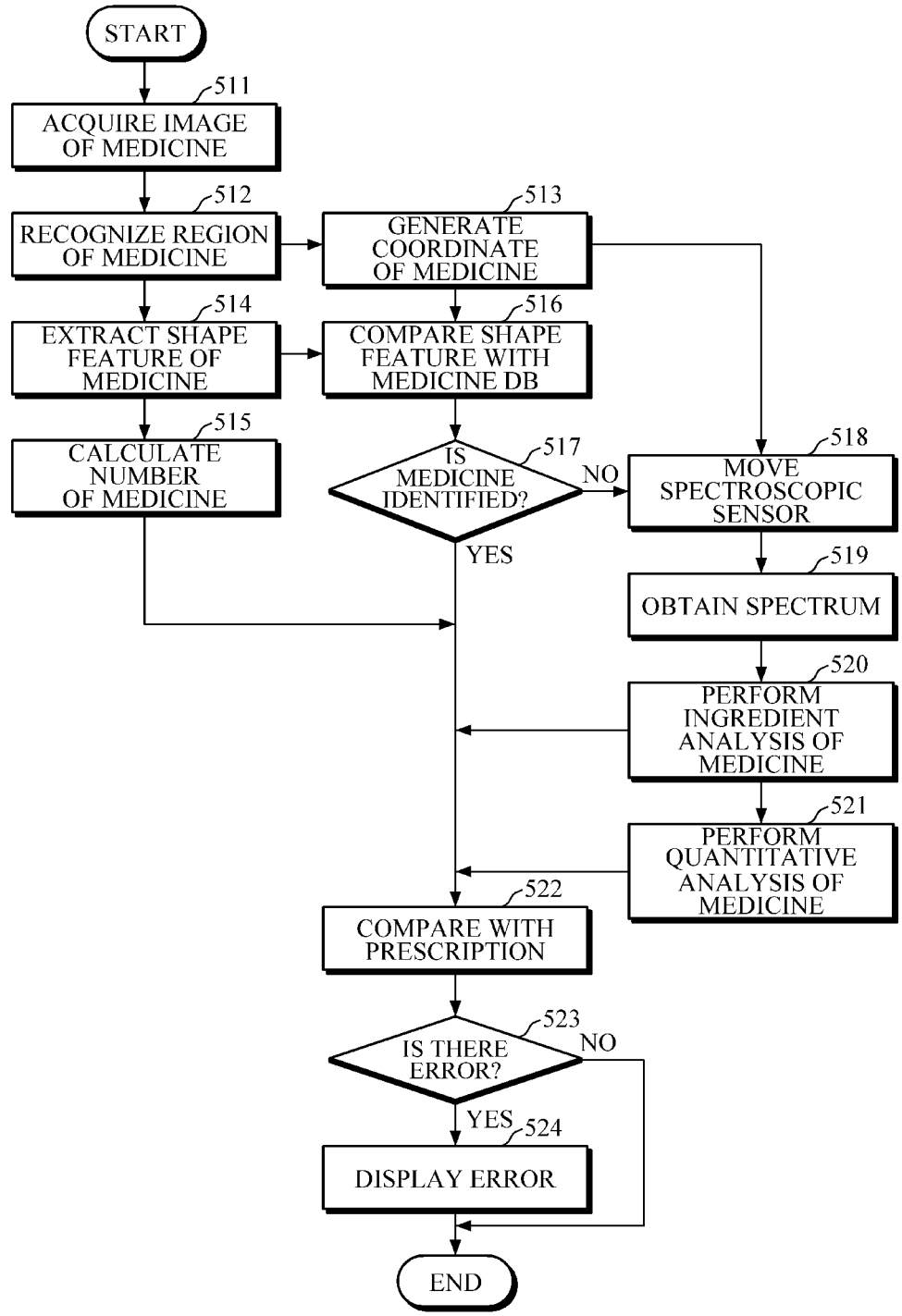
FIG. 5 is a flowchart illustrating a method of identifying pharmaceuticals according to an example embodiment of the disclosure.

FIG. 5 is a flowchart illustrating a method of identifying pharmaceuticals according to an example embodiment of the disclosure. The method of FIG. 5 may be another example of a method of identifying pharmaceuticals which is performed by the apparatus 100 for identifying pharmaceuticals.

The apparatus 100 for identifying pharmaceuticals may control an image sensor to acquire images of medicines in a pharmaceutical package in 511. In this case, the image sensor may be disposed below a tray; and once a plurality of pharmaceutical packages are placed on the tray, the image sensor may acquire images of the plurality of pharmaceutical packages by scanning the entire packages below the tray.

Then, the apparatus 100 for identifying pharmaceuticals may recognize regions of each medicine by analyzing the acquired images in 512. Various widely known methods may be used to recognize regions of interest in the images.

Subsequently, the apparatus 100 for identifying pharmaceuticals may generate coordinates of each of the recognized regions in 513. For example, the apparatus 100 for identifying pharmaceuticals may generate coordinates of a center position of each of the recognized regions as coordinates of each medicine.

Next, the apparatus 100 for identifying pharmaceuticals may extract a shape feature of each medicine based on a region recognition result in 514. In this case, the shape feature may include area, character, color, texture, shape, and the like of the recognized regions.

Then, the apparatus 100 for identifying pharmaceuticals may calculate the number of each medicine based on the extracted shape feature of the medicine in 515, may compare the shape feature with a medicine database (DB) in 516, and may identify a drug name based on a result of comparison. In this case, the apparatus 100 for identifying pharmaceuticals may compare similarity between each data in the medicine DB with the shape feature of the medicine by using various similarity calculation algorithms described above; and may identify a drug name, having similarity greater than or equal to the predetermined threshold, as a name of the extracted medicine. In this case, if there is no data, or if there are a plurality of data, which have similarity greater than or equal to the predetermined threshold, the apparatus 100 for identifying pharmaceuticals may determine that a drug name is not identified, and may classify the medicine as requiring precise analysis.

Then, when a name of a specific medicine is not identified upon identification of a drug name in 517, the apparatus 100 for identifying pharmaceuticals may control a spectroscopic sensor to move to a position of the medicine based on coordinate information of the specific medicine in 518.

Subsequently, the apparatus 100 for identifying pharmaceuticals may obtain a spectrum of the medicine in 519, a drug name of which is not identified, by using a spectroscopic sensor and may perform ingredient analysis in 520 and quantitative analysis in 521 of the medicine by using the obtained spectrum. In this case, the apparatus 100 for identifying pharmaceuticals may perform the ingredient analysis and the quantitative analysis by comparing the obtained spectrum with spectrum data of known ingredients stored in a pharmaceutical ingredient DB; and various known methods may be used as a spectrum comparison algorithm.

Next, the apparatus 100 for identifying pharmaceuticals may compare the number of the medicine which is calculated in 515, the name of the medicine which is identified in 516, the pharmaceutical ingredient identified in 520, and a result of quantitative analysis in 521 with prescriptions in 522.

Then, for a medicine having no dispensing error, the apparatus 100 for identifying pharmaceuticals may not display an error; and for a medicine having a dispensing error, the apparatus 100 for identifying pharmaceuticals may display the medicine based on a pharmaceutical package and/or coordinate information of medicine in 524. In this case, the apparatus 100 for identifying pharmaceuticals may control the error display to output errors in different colors, shapes, or characters according to types of errors of the medicines, in which the dispensing errors occur.

Figure 6:
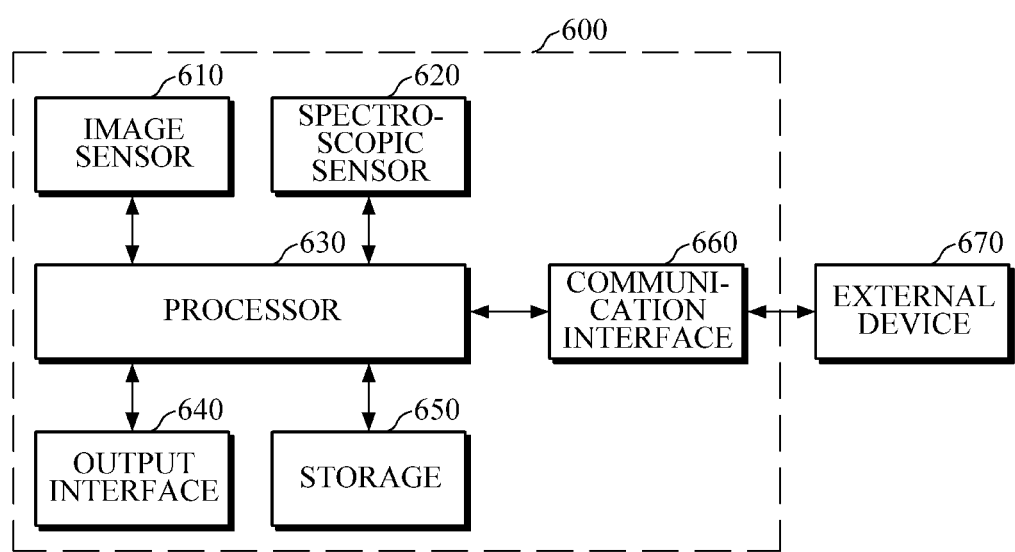
FIG. 6 is a block diagram illustrating a mobile terminal according to an example embodiment of the disclosure.
Figure 7A:
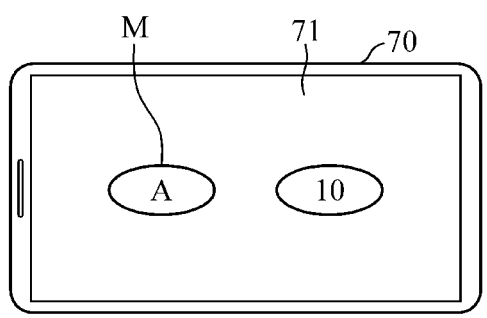
FIGS. 7A and 7B are diagrams illustrating an example of identifying pharmaceuticals in a mobile terminal.
Figure 7B:
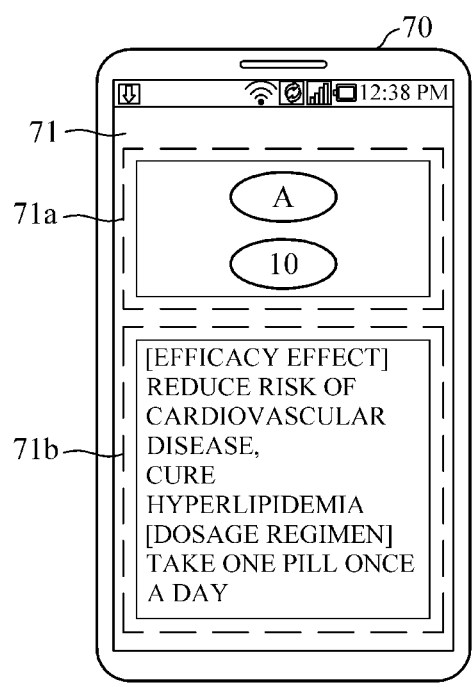

FIG. 6 is a block diagram illustrating a mobile terminal according to an example embodiment of the disclosure. FIGS. 7A and 7B are diagrams illustrating an example of identifying pharmaceuticals in a mobile terminal.

Referring to FIGS. 7A and 7B, a smartphone 70 is used as an example of the mobile terminal 600. However, the mobile terminal 600 is not limited thereto, and may include an information processing terminal, such as a tablet PC, a laptop computer, and the like, which may be carried by a user, or a wearable device which is a smart watch type, a smart band type, a Head-Mounted Display (HMD) type, and the like.

Referring to FIG. 6, the mobile terminal 600 includes an image sensor 610, a spectroscopic sensor 620, a processor 630, an output interface 640, a storage 650, and a communication interface 660.

Referring to FIGS. 6 to 7B, the image sensor 610 may include a CCD, CMOS, and the like. As illustrated in FIG. 7A, the image sensor 610 may be a rear camera module which is disposed at a rear surface of a main body of the smartphone 70. Further, the spectroscopic sensor 620 may be a sensor using Raman spectroscopy, near-infrared spectroscopy, mid-infrared spectroscopy, and the like. The spectroscopic sensor 620 may be disposed on a rear surface of the smartphone 70.

The processor 630 may receive a request for identifying pharmaceuticals from a user, and may control the image sensor 610 and the spectroscopic sensor 620. In this case, the user's request for identifying pharmaceuticals may be input by touch or voice. If the user's request is input by voice, the processor 630 may drive a speech recognition engine mounted therein to perform speech recognition, and may perform an operation related to identification of pharmaceuticals based on the speech recognition result.

Once the request for identifying pharmaceuticals is input from a user, the processor 630 may control the image sensor 610 to acquire images of medicines. For example, when a user directly executes a medicine identification application installed in the mobile terminal 600, or when a user inputs the request for identifying pharmaceuticals by voice, the processor 630 may execute the image sensor 610 disposed at a rear surface of the smartphone 70 as illustrated in FIG. 7A, so that the user may capture an image of the medicine M. Alternatively, the processor 630 may output an image of the medicine M, which is input by the image sensor 610, to a display 71 of the smartphone 70.

Further, the processor 630 may identify a name of the medicine by analyzing the acquired image of the medicine. In this case, the processor 630 may extract a shape feature, such as shape, color, texture, character, and the like of the medicine, by using an image analysis algorithm contained in the processor 630; and may identify a name of the medicine by comparing similarity between the extracted shape feature and a medicine database (DB) stored in the storage 650.

If the medicine DB is not stored in the storage 650 depending on computing performance of the mobile terminal 600, the processor 630 may control the communication interface 660 to communicate with an external device 670 which stores a medicine DB, and may receive the medicine DB from the external device 670 for comparison, or may transmit the shape feature of the medicine to the external device 670 and receive a result of comparison performed by the external device 670.

If the name of the medicine is not identified upon analyzing the image of the medicine, the processor 630 may control a spectroscopic sensor 620. For example, the spectroscopic sensor 630 may emit laser light to the medicine M, and may detect light scattered from an ingredient of the medicine to obtain Raman spectrum using Raman spectroscopy. Alternatively, the processor 630 may provide information for a user to designate a position of the spectroscopic sensor 620.

Once the spectroscopic sensor 620 obtains spectrum data of the medicine, the processor 630 may compare the spectrum data with the pharmaceutical ingredient DB stored in the storage 650, and may identify an ingredient and/or dosage of the medicine. As described above, in the case where the pharmaceutical ingredient DB is not stored in the storage 650, the processor 630 may control the communication interface 660 to communicate with the external device 670, and may analyze the pharmaceutical ingredient of the medicine by using the external device 670.

Once the processor 630 identifies the medicine, the output interface 640 may output a medicine identification result. For example, referring to FIG. 7B, the output interface 640 may include a display 71 disposed on a front surface of the smartphone 70, and may output the medicine identification result on the display 71. For example, the output interface 640 may output the image of the medicine, which is acquired by the image sensor 610, in one area 71*a*, and may output the medicine identification result in another area 71*b*, but the disclosure is not limited thereto.

The disclosure can be realized as a computer-readable code written on a computer-readable recording medium. The computer-readable recording medium may be any type of recording device in which data is stored in a computer-readable manner.

Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that a computer-readable code is written thereto and executed therefrom in a decentralized manner. Functional programs, codes, and code segments needed for realizing the disclosure can be readily deduced by programmers in the technical field to which the invention pertains.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing steps may employ any number of related art techniques for electronics configuration, signal processing and/or control, data processing and the like.

While a few example embodiments have been described above, the scope of the disclosure is not limited thereto and various modifications and improvements made by those of ordinary skill in the art to concepts defined in the following claims should be understood to fall within the scope of the disclosure.

What is claimed is:

1. An apparatus for identifying pharmaceuticals, the apparatus comprising:
an identifier configured to perform at least one of first identification of a medicine based on an image of the medicine in a pharmaceutical package or second identification of the medicine based on a spectrum of the medicine, wherein the identifier comprises:
a tray on which the pharmaceutical package is placed;
an image sensor positioned on a first side of the tray and configured to acquire the image of the medicine in the pharmaceutical package; and a spectroscopic sensor positioned on a second side of the tray and configured to obtain the spectrum of the medicine;

a verifier configured to verify an error in dispensing the pharmaceutical package based on comparison of a result of the at least one of the first identification and the second identification with a prescription upon which the pharmaceutical package is prepared;

a controller configured to, based on a result of the first identification being unsuccessful, control to acquire the spectrum of the medicine upon which the second identification of the medicine is performed; and wherein based on the first identification being unsuccessful, the identifier is further configured to generate coordinate information corresponding to a position of the medicine, with respect to a reference point on the tray, based on the image of the medicine, and the controller is further configured to control the spectroscopic sensor to move to the position of the medicine based on the generated coordinate information to obtain the spectrum of the medicine.

2. The apparatus of claim 1, wherein, in the first identification, the identifier is further configured to extract a shape feature of the medicine based on the image of the medicine, and perform at least one of obtaining a number of the medicine or identifying a name of the medicine based on the extracted shape feature.

3. The apparatus of claim 2, wherein the identifier is further configured to identify the name of the medicine by comparing the extracted shape feature with a medicine database (DB).

4. The apparatus of claim 1, wherein, in the second identification, based on the coordinate information of the medicine, and center coordinates of the pharmaceutical package, the controller is further configured to control obtaining the spectrum of the medicine.

5. The apparatus of claim 1, wherein, in the second identification, based on the spectrum of the medicine, the identifier is further configured to identify at least one of an ingredient or a dosage of the medicine.

6. The apparatus of claim 1, further comprising a display configured to indicate the medicine, with respect to which the error occurs, based on a result of verification of the verifier.

7. The apparatus of claim 6, wherein according to a type of the error, the display is further configured to indicate the error using at least one of different colors, shapes, and characters.

8. The apparatus of claim 7, wherein the type of the error comprises at least one of whether further analysis of the medicine is needed, an error in a name of the medicine, an error in a count of the medicine, an error in an ingredient of the medicine, and an error in a dosage of the medicine.

9. The apparatus of claim 8, wherein the verifier is configured to determine, based on the result of the first identification, at least one of whether the further analysis is needed, the error in the name of the medicine, and the error in the count of the medicine, and determine, based on the result of the second identification, at least one of the error in the ingredient of the medicine and the error in the dosage of the medicine.

10. The apparatus of claim 7, wherein the controller is further configured to control the to indicate the error based on coordinates of the medicine and the type of the error.

11. A method of identifying pharmaceuticals, the method comprising:

acquiring, by using an image sensor, an image of a medicine in a pharmaceutical package, the pharmaceutical package being placed on a tray and the image sensor being positioned on a first side of the tray;

performing first identification based on the image of the medicine in the pharmaceutical package;

obtaining, by using a spectroscopic sensor positioned on a second side of the tray, a spectrum of the medicine based on a result of the first identification being unsuccessful;

performing second identification of the medicine based on the obtained spectrum; and verifying an error in dispensing the pharmaceutical package based on comparison of a result of the at least one of the first identification and the second identification with a prescription upon which the pharmaceutical package is prepared, wherein the obtaining the spectrum comprises: based on the first identification being unsuccessful, generating coordinate information corresponding to a position of the medicine, with respect to a reference point on the tray, based on the image of the medicine, and controlling the spectroscopic sensor to move to the position of the medicine based on the generated coordinate information to obtain the spectrum of the medicine.

12. The method of claim 11, wherein the performing the first identification further comprises:

extracting a shape feature of the medicine based on the image of the medicine; and performing at least one of obtaining a number of the medicine or identifying a name of the medicine based on the extracted shape feature.

13. The method of claim 12, wherein the identifying the name of the medicine comprises comparing the extracted shape feature with a medicine database (DB).

14. The method of claim 11, wherein the performing the second identification comprises identifying at least one of an ingredient or a dosage of the medicine based on the spectrum.

15. The method of claim 11, wherein the verifying comprises verifying whether further analysis of the medicine is needed, an error in a name of the medicine, an error in a count of the medicine, an error in an ingredient of the medicine, and an error in a dosage of the medicine.

16. The method of claim 11, further comprising displaying an indication of the medicine, with respect to which the error occurs, based on a result of the verifying.

17. A mobile terminal, comprising:

an image sensor configured to capture an image of a medicine in a pharmaceutical package, the pharmaceutical package being placed on a tray and the image sensor being positioned on a first side of the tray;

a spectroscopic sensor positioned on a second side of the tray and configured to obtain a spectrum of the medicine; and a processor configured to control the image sensor and the spectroscopic sensor, wherein the processor is further configured to perform first identification of the medicine based on the image of the medicine, and based on a result of the first identification being unsuccessful, configured to control the spectroscopic sensor to obtain the spectrum of the medicine and perform second identification of the medicine based on the obtained spectrum, and wherein based on the first identification being unsuccessful, the processor is further configured to generate coordinate information corresponding to a position of the medicine, with respect to a reference point on the tray, based on the image of the medicine, and is further configured to control the spectroscopic sensor to move to the position of the medicine based on the generated coordinate information to obtain the spectrum of the medicine.

18. The mobile terminal of claim 17, wherein:
the first identification comprises obtaining a shape feature of the medicine, and identifying a name of the medicine by comparing the obtained shape feature with a medicine DB; and
the second identification comprises identifying at least one of an ingredient or a dosage of the medicine.

19. The mobile terminal of claim 17, further comprising a communication interface configured to transmit, to an external device, information on the medicine, which is not identified by at least one of the first identification and the second identification, and configured to receive information on identification of the medicine from the external device.

20. The mobile terminal of claim 17, further comprising an output interface configured to output information on the first identification and/or the second identification of the processor.

21. The apparatus of claim 1, wherein the identifier further comprises a spectroscopic sensor transfer assembly configured to transfer the spectroscopic sensor, and wherein the controller is further configured to, based on the first identification being unsuccessful, cause the spectroscopic sensor transfer assembly to move the spectroscopic sensor to the position of the medicine based on the generated coordinate information.

22. The apparatus of claim 1, further comprising a display positioned below the tray, the display comprising a plurality of light sources provided corresponding to respective positions of the pharmaceutical package, wherein the controller is further configured to control the display to drive at least one light source, among the plurality of light sources, corresponding to the position of the medicine, of which the error is verified in the first identification and the second identification.

23. The apparatus of claim 1, wherein a plurality of pharmaceutical packages are arranged on the tray,
the apparatus further comprising a display positioned below the tray, the display comprising a plurality of light sources provided corresponding to respective positions of the plurality of pharmaceutical packages,
wherein the controller is further configured to control the display to drive at least one light source, among the plurality of light sources, corresponding to a position of the pharmaceutical package of which the error is verified in the at least one of the first identification and the second identification.

* * * * *